United States Patent [19]

Anderson et al.

[11] Patent Number: 4,789,097

[45] Date of Patent: Dec. 6, 1988

[54] HUMIDITY CONTROL APPARATUS FOR AN AREA

[75] Inventors: Lawrence M. Anderson, Rochester; David P. Wixson, Westland, both of Mich.

[73] Assignee: VTM Industries, Mt. Clemens, Mich.

[21] Appl. No.: 96,907

[22] Filed: Sep. 14, 1987

[51] Int. Cl.⁴ .............................................. B01F 3/02
[52] U.S. Cl. ................................. 236/1 EB; 165/20; 236/44 A; 236/94
[58] Field of Search .................. 236/94, 44 B, 44 C, 236/44 A, 1 EB, 1 EA, 1 ER; 165/20; 62/176.4, 176.6, 175; 261/DIG. 34, 74, 41.1

[56] References Cited

U.S. PATENT DOCUMENTS

| | | | |
|---|---|---|---|
| 2,979,266 | 4/1961 | Bailey | 236/44 A |
| 4,072,866 | 2/1978 | Kabat | 236/1 ER |
| 4,384,462 | 5/1983 | Overman et al. | 236/1 EA |
| 4,502,288 | 3/1985 | Lynch | 62/171 |
| 4,572,428 | 2/1986 | Groff et al. | 165/20 X |

Primary Examiner—William E. Wayner
Attorney, Agent, or Firm—Basile & Hanlon

[57] ABSTRACT

A humidity control apparatus for controlling the humidity level of air within a given area. The apparatus includes a plurality of control valves connected in fluid flow communication to a fluid supply source for injecting water into the air within the area for controlling the humidity level within the area. A controller outputs electrical signals controlling the activation of the fluid flow control valves based on temperatures and sensor inputs within the area input to the controller along the with a multi-position switch which controls the present humidity set point within the area as well as the delay between activation of various numbers of the control valves in sequence with a predescribed time delay.

6 Claims, 4 Drawing Sheets

HUMIDITY CONTROL APPARATUS FOR AN AREA

BACKGROUND OF THE INVENTION

1. Field of the Invention:

The present invention relates, in general, to humidity control apparatus and, more specifically to humidity control apparatus for use in controlling the humidity within the air in a sealed or partially sealed enclosure.

2. Description of the Prior Art:

Apparatus for controlling humidity within an area or sealed environment are well known. Such apparatus are typically employed in paint spray booths and air drying booths, etc., in manufacturing plants to control the humidity of the air in such booths. Typically such apparatus inject water into the area either directly or along the walls in a steady stream to regulate the humidity of the air at a desired level.

Previously devised humidity control systems have utilized solenoid operated electromechanical valves to control the injection of a fluid, such as air and/or water into or through a predetermined area. A plurality of such valves are connected to a fluid supply by individual control switches. The switches are manually operated to activate selected valves to establish the humidity within the area at a predetermined level. However, the manual activation and de-activation of each valve requires manual intervention by an operator to maintain the humidity within the area within prescribed limits. This is not only costly, but is also slow in response to changing conditions within this area.

It would be desirable to provide a humidity control system which precisely regulates the humidity within an area. It would also be desirable to provide a humidity control system which automatically controls the humidity within a given area within preset levels. Finally, it would be desirable to provide a humidity control system which eliminates the need for manual operation of humidity fluid control valves within the area.

SUMMARY OF THE INVENTION

The present invention is a humidity control apparatus for an area. The area may be partially open at various locations or partially or totally sealed. The apparatus includes a controller which controls the amount of fluid flow into the area to regulate the humidity level of the air within the area. The desired humidity level of the air within the area is pre-set by input switches connected to the controller. The switch output may be varied as desired to energize selected numbers of fluid control valves. Humidity, temperature and air flow sensors are mounted within the area and are input to the controller for sensing the humidity, temperature and air flow, respectively, within the area.

A plurality of switches are input to the controller for setting the desired humidity set point within the area as desired. Typically, the switch settings, which input a binary code to the controller, enable the controller through its stored control program to set the humidity level within the area between prescribed limits.

In order to control the humidity, the controller outputs signals to a plurality of solenoid operated electromechanical valves which control a fluid flow through or into the area. Under the control program stored within the controller, the solenoids are sequenced in a step pattern at preset intervals when the humidity set point is greater or less than 27%, for example, of the sensed humidity level within the area. The solenoid valves controlling the fluid flow are connected to a pump or a common fluid supply source and are spaced throughout the area. Upon sequencing, the valves are activated one or two at a time and then in increasing numbers, such as two any time, three any time, etc., in varied patterns throughout the area to provide an even humidity level throughout the entire area.

Since the valves are connected to a common pump or fluid supply, they may be automatically controlled by the controller to maintain the humidity within the area at a preset level. Further, by sequencing the valves in a step pattern with valves being spaced throughout the area, a preset humidity level may be more precisely maintained throughout the entire area than previously possible with prior humidity control systems.

BRIEF DESCRIPTION OF THE DRAWING

The various features, uses and other advantages of the present invention will become more apparent by referring to the following detailed description and drawing in which.

DESCRIPTION OF THE PREFERRED EMBODIMENTS

Figure 1:
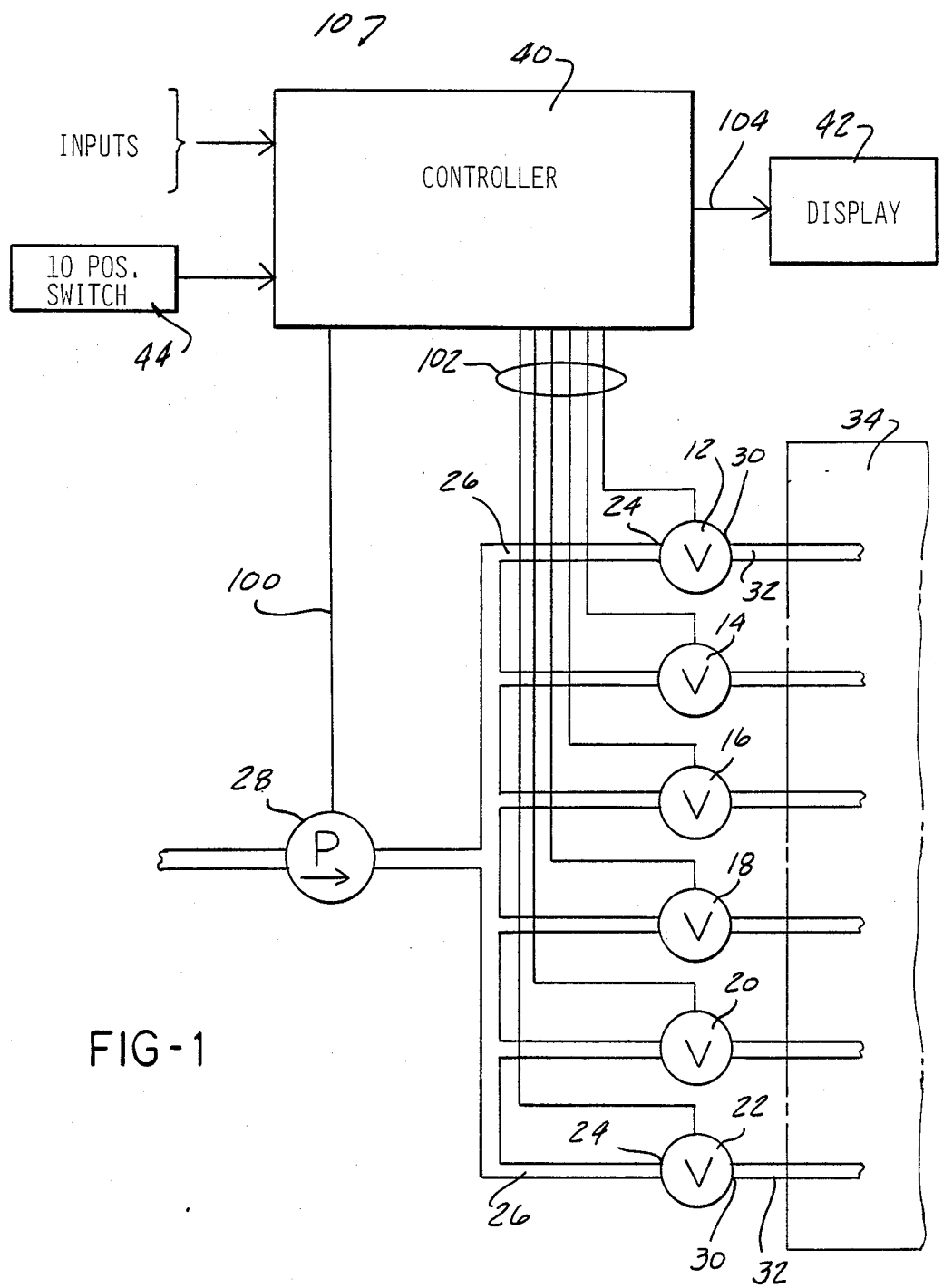
FIG. 1 is a schematic view of the humidity control apparatus of the present invention.

Throughout the following description and drawing, an identical reference number is used to refer to the same component shown in multiple figures of the drawing.

In general, the present invention is a humidity control apparatus for an area, such as a sealed or partially sealed area, booth, compartment, etc. Particularly, the humidity control apparatus of the present invention is ideally suited for paint spray booths, air booths, etc., utilized in manufacturing facilities.

As shown in FIGS. 1-4 the humidity control apparatus 10 is illustrated as including six fluid flow electromechanical, solenoid operated control valves. This is by example only and not limitation. It will be understood that any number of fluid flow control valves may be employed in the present invention depending upon the size of the area which is to have its humidity controlled by the apparatus of this invention.

The humidity control apparatus as shown in FIG. 1 includes a plurality of fluid flow means for controlling the flow of a fluid, such as water, into an area 34. In the present example, the fluid flow control means includes six solenoid operated, electro-mechanical valves 12, 14, 16, 18, 20 and 22. The valves have input ports denoted in general by reference number 24 which are connected via fluid flow conduits 26 to a common pump means 28 or fluid source. The pump means 28 may be any conventional pump connected to a source of fluid flow, such as a water pipeline for injecting the fluid, under pressure, through the valves. The outputs 30 of the valves are likewise connected to individual conduits 32 which extend into the area 34 and are spaced throughout the area 34. Opening and closing of the valves controls the amount of water flow into the area which controls the humidity level of the air within the area 34 as desired for a particular manufacturing operation, such as painting, drying, etc. Alternately, the valves may be connected directly to the fluid flow source without need for the pump 28.

The valves 12, 14, 16, 18, 20 and 22 are controlled by a controller 40 which may be of a micro-processor. For example, a micro-processor manufactured by Motorola Corporation under model number 68705R may be utilized in the controller 40. The controller 40 as is typical includes a control program stored in a memory, not shown, which controls the activation and de-activation of the control valves 12, 14, 16, 18, 20, 22 depending upon the inputs to the controller 40. The controller 40 also controls a display 42 which can be utilized to display the current temperature and/or humidity levels within the area 34 as well as the humidity set point as described hereafter.

As shown in FIGS. 1 and 2, a plurality of inputs are connected to the controller 40. A ten position switch indicated in general by reference number 44 is connected to the controller 40. In the present example, only eight of the outputs of the ten position switch 44 are input to the controller 40. The second, third and fourth switches on the ten position switch 44, indicated in general by control lines 46 and 48 and 50, set a binary code into the controller 40 which programs a delay in the activation of the valves 12, 14, 16, 18, 20 and 22 as described hereafter. The remaining control lines denoted by reference numbers 52, 54, 56, 58 and 60 set a five bit binary code input to the controller 40 for setting a predetermined humidity set point within the area 34.

Also input to the controller 40 is a display push button 70 for the humidity set point and a push button 72 for displaying the temperature within the area 34. Further inputs to the controller 40 through amplifier circuits denoted in general by references numbers 74 and 76 are the outputs from a humidity sensor 78 and a temperature sensor 80.

Figure 3:
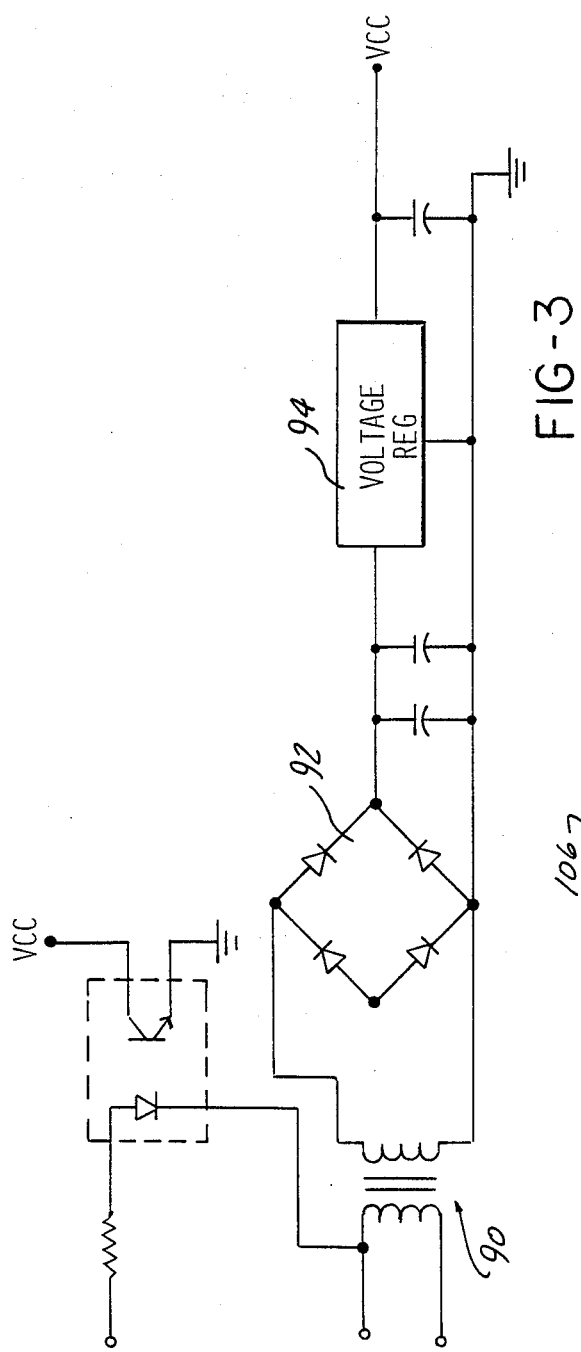
FIG. 3 is a schematic diagram of the power circuit for the humidity control apparatus of the present invention.

Also, an air flow input from an air flow sensor 81 registering the presence of the flow of air through the area is input to the controller 40. Referring briefly to FIG. 3, input power to the controller 40 at a level labeled VCC is provided by a power supply circuit containing a transformer 90, a bridge rectifier circuit 92, a voltage rectifier 94 as well as appropriate filter circuits. This outputs the required low level D.C. voltage from a high level A.C. input line to the controller 40 to regulate the voltage to the controller 40.

Figure 2A:
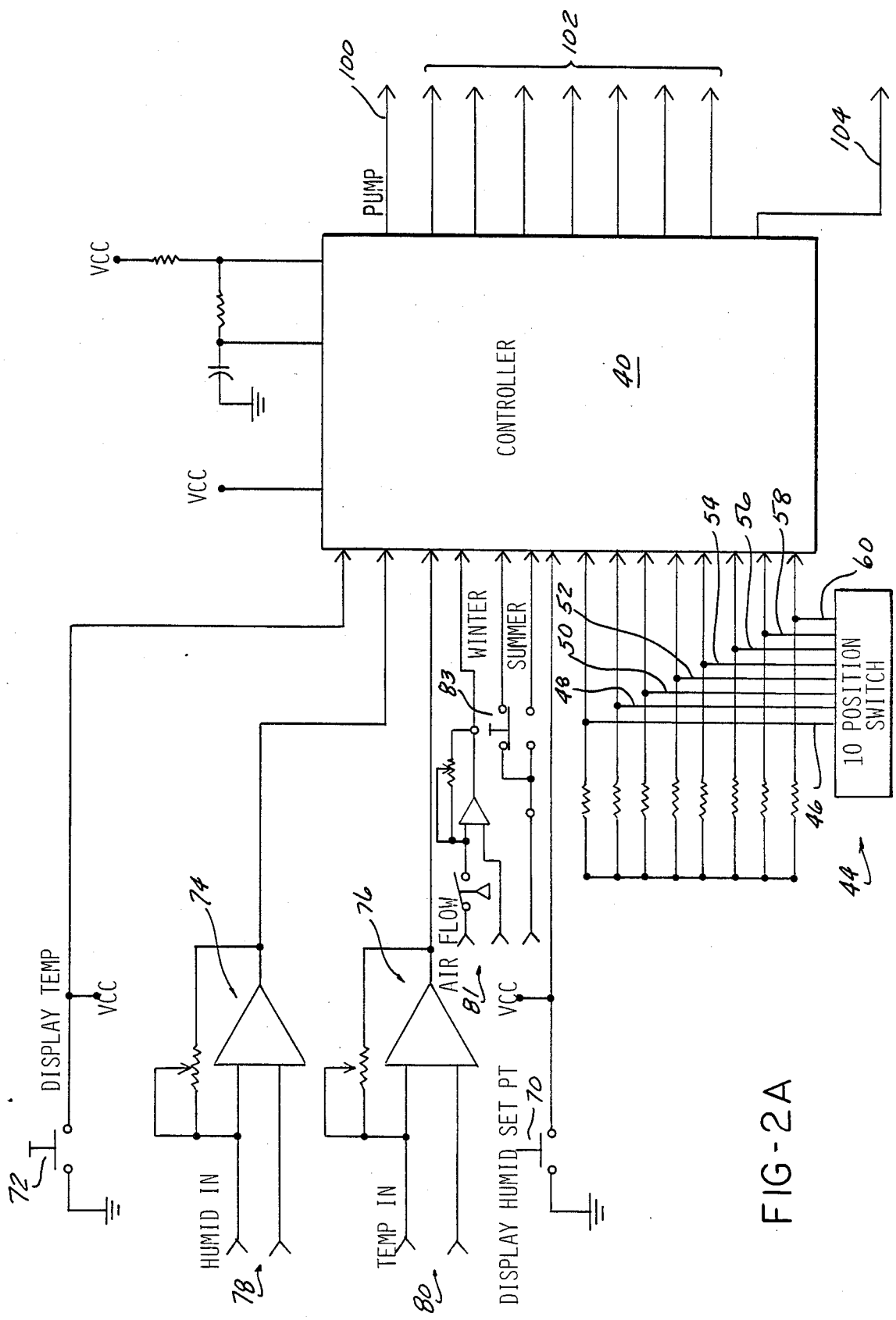
FIGS. 2A and 2B are circuit control diagrams illustrating the inputs and outputs to and from the controller shown in FIG. 1.
Figure 2B:
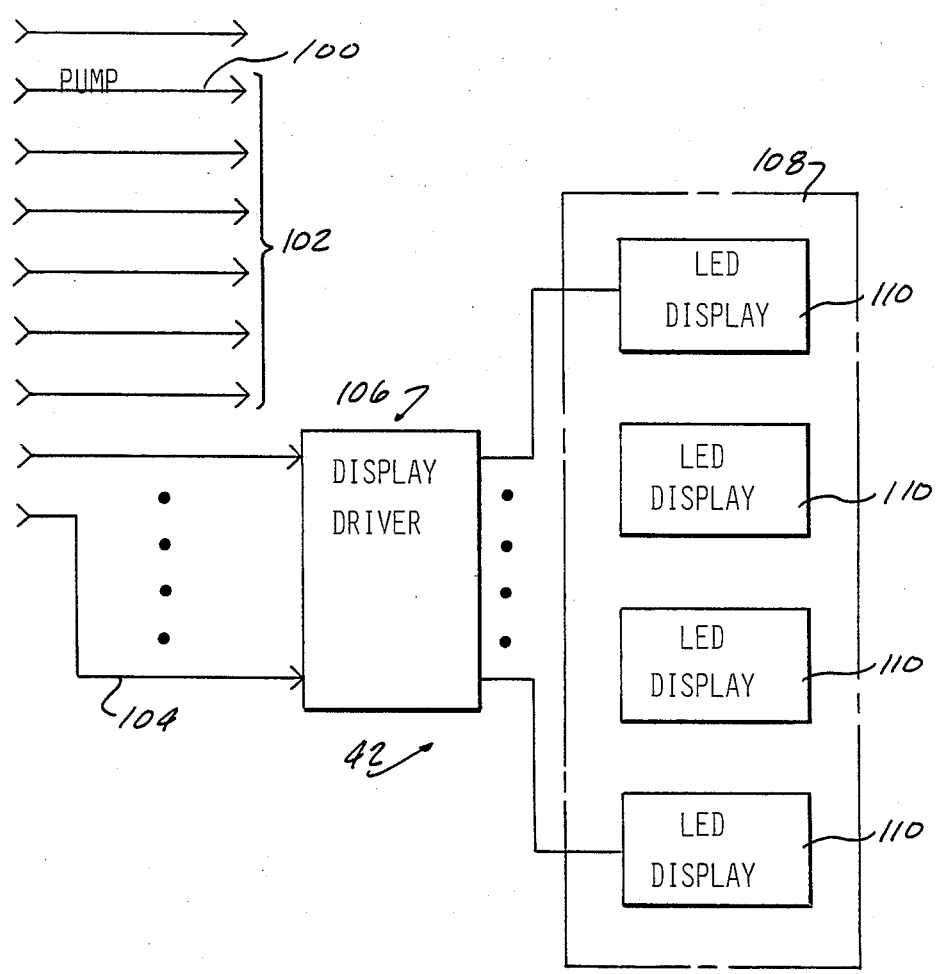

Referring again to FIGS. 2A and 2B, the controller 40 provides an output on control line 100 to control the actuation of the pump 28. The pump 28 in the present invention controls the flow of a fluid, such as water, through the control valves 12, 14, 16, 18, 20 and 22 as selected ones of the control valves are actuated by the controller 40. The controller 40 also outputs on a series of control lines denoted in general by reference number 102 control signals to each of the respective control valves 12, 14, 16, 18, 20, 22 as shown in FIGS. 1, 2A and 2B. The operation of the controller in sequencing the control valves 12, 14, 16, 18, 20 and 22 will be described hereafter.

Figure 4:
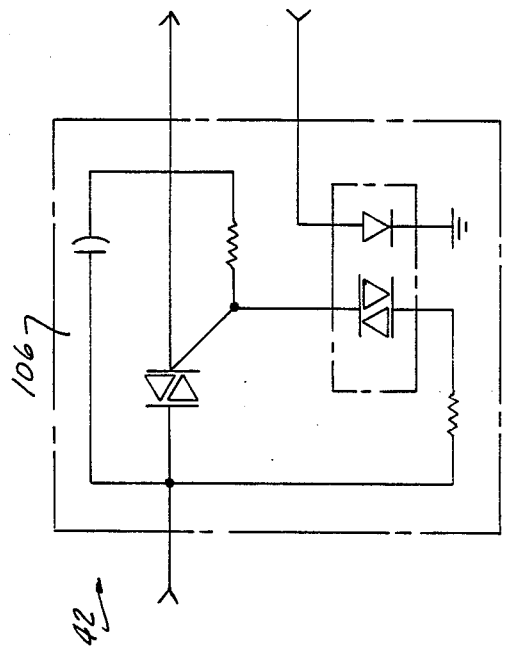
FIG. 4 is a schematic diagram of a typical display driver shown in FIG. 2B.

The display 42 shown in general in FIGS. 2B and 4 includes a display driver circuit 106 utilizing triacs to provide the power to a conventional LED display 108 comprising individual LED elements 110.

Also input to the controller 40 is the output from a switch 83 selectively positionable between two positions, labelled "winter" or "summer" modes. In the normally closed "summer" mode, the controller 40 automatically activates the valves due to the higher humidity levels existent during the summer months. During winter, the switch 83 causes the controller to sequence the valves on after a time delay due to the relatively lower humidity levels encountered during the winter months.

In operation, the controller 40 receives inputs from the humidity sensor 78, the temperature sensor 80, the air flow sensor 81 and the winter/summer mode switch 83 located within the area 34 in which the humidity is to be controlled. Also input to the controller 40 are the outputs from the ten position switch 44 shown in FIG. 2A which set the delay between the sequencing of the fluid control valves 12, 14, 16, 18, 20 and 22 and the desired humidity set point within the area 34.

When a desired humidity set point within the area 34 is to be set, such as, for example, between 55 and 86 percent humidity, a binary code, such as 00000, 10000, 01000 on the fifth, sixth, seventh, eighth and ninth switch positions of the ten position switch 44 is set. Likewise a binary code such as 000 for a delay of zero minutes, 100 for delay of four minutes, 010 for a delay of eight minutes, etc., on the second, third and fourth switches of the switch 44 is also set. This preset data along with the humidity level and the presence of air flow within the area 34 is analyzed by the controller 40 by its control program. The controller 40 then outputs on control line 100 a signal activating the pump 28 and additional signals on lines 102 to selected ones of the control valves 12, 14, 16, 18, 20 and 22 in a preset sequence programmed in the control program of the controller 40.

The valves 12, 14, 16, 18, 20 and 22 are selectively activated by the controller 40, with larger numbers being activated when there is a large difference between the actual and preset humidity levels and fewer and fewer as the actual humidity level approaches the humidity set point, to control the amount of water injected into the area 34 to control the humidity level within the area 34. For example, upon initiation, control valve 12 will be initiated. After a preset time delay, such as 2, 4, 8, 12, 16, 20, 24 or 28 minutes, another control valve, such as control valve 16 positioned at a different location within the area 34 will be activated and the first control valve 12 deactivated. Subsequently, after the preset time delay programmed by the ten position switch 44 in the "winter" mode, several of the control valves, such as control valves 14 and 16, may be energized. Alternate pairs, triplets, or quadruplets of the control valves 12, 14, 16, 18, 20 or 22 may also be energized sequentially in groups after each preset time delay. This provides an even flow of water into the area 34 and enables the humidity within the area 34 to reach the preset level.

In summary, there has been disclosed a unique humidity control apparatus for an area which provides automatic control of the humidity level within the air in an area. Various control valves are activated to inject a fluid, such as water, into the air within the area in a step sequence with or without pre-set time delays between the activation of the valves singly or in various combinations to provide fluid flow at various locations throughout the area. This provides a constant humidity level throughout the entire area equal to the preset humidity level in an automatic, precise and quick manner.

We claim:

1. A humidity control apparatus for controlling the humidity within an area comprising:
   a plurality of fluid flow control means for controlling the injection of fluid into the air within the area;
   input switch means for establishing a pre-set humidity set point for the area;
   humidity sensing means, mounted within the area, for sensing the current humidity level in the air within the area;
   air flow sensing means for sensing the presence of air flow within the area; and
   control means including a stored program and responsive to the input switch means, the air flow sensing means and the humidity sensing means for automatically activating the fluid flow control means to maintain the humidity level of the air within the area at the preset humidity set point.

2. The humidity control apparatus of claim 1 wherein the fluid flow control means comprises a plurality of electrically operated solenoid valves.

3. The apparatus of claim 1 further including:
   switch means for setting a preset amount of time delay for energization of the fluid flow control means; and
   on/off switch means, switchable between "on" and "off" positions corresponding to the activation and the deactivation, respectively, of the time delay;
   the control means being responsive to the switch means and the on/off switch means for delaying the energization of the fluid flow control means the preset amount of time delay when the on/off switch means is in the "on" position.

4. The humidity control apparatus of claim 1 further including:
   display means, responsive to the control means, for displaying preset humidity set point.

5. The humidity control apparatus of claim 4 further including:
   temperature sensing means for sensing the temperature of the air within the area; and
   temperature and humidity set point display request input means;
   the control means being responsive to the temperature sensing means and the temperature and humidity set point display request input means for controlling the display means to display the temperature and humidity set point.

6. A humidity control apparatus for controlling the humidity within an area comprising:
   a plurality of electrically operated solenoid valves for controlling the injection of fluid into the air within the area;
   input switch means for establishing a preset humidity set point for the area;
   humidity sensing means, mounted within the area, for sensing the current humidity level in the air within the area;
   switch means for setting a preset amount of time delay for energization of the valves;
   on/off switch means, switchable between both "on" and "off" positions corresponding to the activation and the de-activation, respectively, of the time delay;
   temperature sensing means, mounted within the area, for sensing the temperature of the air within the area;
   temperature and humidity set point display request input means;
   display means, responsive to the control means, for displaying the preset humidity set point and temperature as the preset humidity set point and temperature are requested;
   air flow sensing means for sensing the presence of air flow within the area; and
   control means including a stored program and responsive to the input switch means, the air flow sensing means and the humidity sensing means for automatically activating the valves to maintain the humidity level of the air within the area at the preset humidity set point, and responsive to the switch means and the on/off switch means for delaying the energization of the valves a preset amount of time delay as set by the switch means when the on/off switch means is in the "on" position, and responsive to the temperature sensing means and the temperature and humidity set point display request input means for controlling the display means to display the temperature and humidity set point as requested.

* * * * *